United States Patent [19]

Champagne et al.

[11] Patent Number: 5,088,292
[45] Date of Patent: Feb. 18, 1992

[54] BEARING PUMP CONTROL FOR LUBRICATING HYDRODYNAMIC COMPRESSOR BEARINGS

[75] Inventors: John M. Champagne, Seattle, Wash.; Peter D. Waters, San Diego, Calif.

[73] Assignee: Sundstrand Corporation, Rockford, Ill.

[21] Appl. No.: 550,544

[22] Filed: Jul. 10, 1990

[51] Int. Cl.$^5$ .............................. F25B 31/02
[52] U.S. Cl. .............................. 62/84; 62/192; 62/469; 62/DIG. 2
[58] Field of Search ................. 62/192, 193, 468, 469, 62/502, 208, 209, 84, 114, DIG.2, DIG. 17

[56] References Cited

U.S. PATENT DOCUMENTS

| | | | |
|---|---|---|---|
| 2,949,750 | 8/1960 | Kramer | 62/DIG. 2 |
| 3,081,606 | 3/1963 | Brose et al. | 62/DIG. 2 |
| 3,221,984 | 4/1964 | Ditzler | 230/207 |
| 3,422,635 | 1/1969 | Trenkowitz | 62/469 |
| 3,728,857 | 4/1973 | Nichols | 62/469 |
| 4,598,556 | 7/1986 | Mokadam | 62/117 |
| 4,809,521 | 3/1989 | Mokadam | 62/498 |

OTHER PUBLICATIONS

"A New Technology in Energy-Efficient Electrically Driven Aircraft Environmental Control Systems", by W. Cloud, J. McNamara and David B. Wigmore, presented at the 21st IECEC Conference, Aug. 25-29, 1986, Art #869390 American Chemical Society, pp. 1606-1702.

Primary Examiner—Harry B. Tanner
Attorney, Agent, or Firm—Antonelli, Terry, Stout & Kraus

[57] ABSTRACT

A refrigeration system (10) having a compressor rotor (20) rotatably supported by a plurality of hydrodynamic bearings (22 and 24) lubricated by oiless pressurized liquid refrigerant supplied to a refrigerant circuit (36) coupled to the hydrodynamic bearings at least in part from the compressor rotor and pressurizing refrigerant which flows to a condenser (34) providing liquid refrigerant which flows to an evaporator (68) in fluid communication with the condenser includes a bearing pump (26), coupled to the refrigerant circuit and to the condenser, for providing pressurized refrigerant to the refrigerant circuit at a pressure higher than a pressure of the refrigerant provided by the compressor rotor when the bearing pump is operating; and a controller (28) for activating the bearing pump in accordance at least one the predetermined conditions of operation of the refrigeration system.

25 Claims, 2 Drawing Sheets

BEARING PUMP CONTROL FOR LUBRICATING HYDRODYNAMIC COMPRESSOR BEARINGS

CROSS-REFERENCE TO RELATED APPLICATIONS

Reference is made to U.S. Pat. application Ser. No. 550,867, entitled "Superheat Sensor With Single Coupling To Fluid Line", filed on even date herewith, which is assigned to the Assignee of the present invention, which application is incorporated herein by reference in its entirety; and to U.S. Pat. application Ser. No. 550,433, entitled "Vapor Cycle Cooling System Having a Compressor Rotor Supported With Hydrodynamic Compressor Bearings", filed on even date herewith, which is assigned to the Assignee of the present application, which application is incorporated herein by reference in its entirety; and to U.S. Pat. application Ser. No. 550,506, entitled "Hydrodynamic Bearing Protection System and Method", filed on even date herewith, which is assigned to the Assignee of the present invention, which application is incorporated herein by reference in its entirety; and to U.S. Pat. application Ser. No. 550,458, entitled "Speed Control of a Variable Speed Aircraft Vapor Cycle Cooling System Condenser Fan and Compressor and Method of Operation", filed on even date herewith, which is assigned to the Assignee of the present invention, which application is incorporated herein by reference in its entirety; and to U.S. Pat. application Ser. No. 550,434, entitled "Control System For Controlling Surge As a Function of Pressure Oscillations and Method", filed on even date herewith, which is assigned to the Assignee of the present invention, which application is incorporated herein by reference in its entirety; and to U.S. Pat. application Ser. No. 550,432, entitled "Refrigeration System With Oiless Compressor Supported By Hydrodynamic Bearings With Multiple Operation Modes and Method of Operation", filed on even date herewith, which is assigned to the Assignee of the present invention, which application is incorporated herein by reference in its entirety; and to U.S. Pat. application Ser. No. 550,631, entitled "Vapor Cycle System Evaporator Control", filed on even date herewith, which is assigned to the Assignee of the present invention, which application is incorporated herein by reference in its entirety.

TECHNICAL FIELD

The present invention relates to refrigeration systems which do not include oil within the refrigerant.

BACKGROUND ART

U.S. Pat. No. 4,598,556, which is assigned to the Assignee of the present invention, discloses a high efficiency refrigeration system in which a non-azeotropic binary refrigerant is used. The disclosed system has a multiple stage compressor. Multiple heat exchangers are provided in series with the refrigeration output from the condenser for cooling the refrigerant prior to expansion by the evaporator.

An article entitled "A New Technology in Energy-Efficient Electrically Driven Aircraft Environmental Control Systems" authored by W. Cloud, J. McNamara and David B. Wigmore, presented at the 21st IECEC Conference, Aug. 25-29, 1986, discloses a vapor cycle cooling system for airframes having a multiple stage compressor with multiple subcoolers for controlling the temperature of a non-azeotropic binary refrigerant. The disclosed system does not suggest that the refrigerant may be to support the hydrodynamic bearings.

U.S. Pat. No. 4,809,521, which is assigned to the Assignee of the present invention, discloses a high efficiency cooling system utilizing non-azeotropic binary refrigerant fluid having a single stage compressor. A plurality of heat exchangers are coupled between the output of the condenser and the evaporator for cooling the refrigerant prior to expansion by the evaporator.

U.S. Pat. No. 3,221,984 discloses an oil supply system for a compressor in a refrigeration system. The oil supply system provides pressurized oil to the bearings of the compressor after the compressor motor is deenergized while the compressor is still rotating at high speed. The rotational inertia of the compressor applies pressurized gas from the compressor to an oil tank above the oil level which forces oil to flow to the bearings of the compressor for a period sufficient for the compressor to stop rotating.

Refrigeration systems utilize a mixture of refrigerant and oil to lubricate the compressor and other parts in the system. After a system is first charged there is no convenient way to directly determine the amount of oil contained in the system since the oil, unlike the refrigerant, does not evaporate from the system. Having substantial oil in a refrigeration system above an amount which is carried by the refrigerant charge could interfere with the operational efficiency of the system.

DISCLOSURE OF THE INVENTION

The present invention is a refrigeration system and method of operating a refrigeration system in which an oiless refrigerant is supplied to hydrodynamic bearings which rotatably support a compressor rotor with a bearing pump providing liquid state pressurized refrigerant to the hydrodynamic bearings under predetermined operational conditions of the refrigeration system. During operation of the refrigeration system, the compressor provides pressurized refrigerant which is applied to the hydrodynamic bearings which rotatably support the compressor rotor. Under certain conditions of system operation, the quantity and pressure of pressurized refrigerant provided by the compressor to the hydrodynamic bearings is insufficient for their operation without risking substantial bearing wear or failure. A controller controls the activation of the bearing pump to provide supplementary pressurized refrigerant to the hydrodynamic bearings at a pressure higher than that provided by the compressor. As a result, the hydrodynamic bearings are protected against increased wear or premature failure which would be consequent from their being supplied with refrigerant below a minimum pressure and flow rate for which the bearings are designed to operate. The present invention is preferably implemented in a cooling system for avionics of an airframe.

An oiless refrigeration system has an advantage of permitting precise control of the quantity of lubrication for moving parts. As a result of using the refrigerant to provide bearing surfaces the cooling system efficiency cannot be adversely affected by residual oil as in the prior art.

A refrigeration system having a compressor rotor rotatably supported by a plurality of hydrodynamic bearings lubricated by oiless pressurized liquid refrigerant and pressurizing refrigerant which flows to a condenser providing liquid refrigerant which flows to an evaporator in fluid communication with the condenser and the compressor in accordance with the invention includes a refrigerant circuit coupled to the and to the condenser for providing pressurized liquid refrigerant to the hydrodynamic bearings from the condenser continuously during operation of the compressor and pressurized liquid refrigerant flowing from the bearings to the condenser; a bearing pump, coupled to the refrigerant circuit and to the condenser, for providing liquid refrigerant to the refrigerant circuit at a pressure higher than a pressure of the refrigerant provided by the compressor rotor when the bearing pump is operating to the refrigeration circuit; at least one sensor, each sensor sensing an operational parameter of the refrigeration system and providing a signal representative of the sensed parameter; and a controller, responsive to at least one signal representative of a sensed parameter, for controlling the operation of the bearing pump as a function of the at least one signal to provide pressurized refrigerant to the refrigerant circuit at a pressure higher than a pressure of refrigerant provided by the compressor.

One sensor is a first temperature sensor sensing a temperature of a heat exchange fluid at the condenser; and the controller controls activation of the bearing pump as a function of the sensed temperature at the condenser. The bearing pump is activated by the controller unless the temperature sensed by the first temperature sensor is greater than a set temperature.

A first sensor is a temperature sensor sensing a temperature of a heat exchange fluid at the condenser and a second sensor is a temperature sensor which senses a temperature of a heat exchange fluid at the evaporator; and the controller controls activation of the bearing pump as a function of a difference between the temperatures sensed by the first and second sensors. The bearing pump is activated by the controller unless the difference between the temperatures sensed by the first and second sensors is greater than a set difference.

One sensor is a speed sensor sensing a speed of rotation of the compressor rotor; and the controller controls activation of the bearing pump as a function of the sensed speed of the compressor rotor. The bearing pump is activated by the controller unless the speed of rotation sensed by the speed sensor is greater than a speed of rotation of the rotor.

One sensor is a pressure sensor sensing a pressure drop across the hydrodynamic bearings; and the controller controls activation of the bearing pump as a function of the sensed pressure drop across the hydrodynamic bearings. The bearing pump is activated by the controller in response to the sensed pressure drop across the hydrodynamic bearings being less than a set pressure. The controller activates the bearing pump for a set time interval in response to the sensed pressure drop across the hydrodynamic bearings being less than the set pressure drop for a predetermined time interval.

The controller causes the bearing pump to be activated for a set time interval in response to the controller turning on the refrigeration system.

In accordance with a preferred embodiment of the invention, one sensor is a first temperature sensor sensing a temperature of a heat exchange fluid at the condenser; one sensor is a second temperature sensor sensing a temperature of a heat exchange fluid at the evaporator; one sensor is a speed sensor sensing a speed of rotation of the compressor rotor; one sensor is a pressure sensor sensing a pressure drop across the hydrodynamic bearings; and wherein the controller causes the bearing pump to be activated for a set time interval in response to the controller turning on the refrigeration system and controls the activation of the bearing pump as a function of the sensed temperature at the condenser, a difference between the temperature sensed by the first and second sensors, the sensed speed of rotation of the compressor rotor and the sensed pressure drop across the hydrodynamic bearings. The bearing pump is activated by the controller unless the sensed temperature sensed by the first sensor is greater than a set temperature, the difference between the temperatures sensed by the first and second sensors is greater than a set difference, the sensed pressure drop across the hydrodynamic bearings is more than a set pressure, the speed of rotation is greater than a set speed of rotation of the rotor, and the bearing pump has been activated for a set time interval in response to the controller turning on the refrigeration system.

A refrigeration system having a compressor rotor rotatably supported by a plurality of hydrodynamic bearings lubricated by oiless pressurized liquid refrigerant supplied to a refrigerant circuit coupled to the hydrodynamic bearings at and to a condenser, the pressurized liquid refrigerant flowing least in part continuously from the condenser during operation of the compressor and pressurized liquid refrigerant flowing from the bearings to the condensor and pressurizing refrigerant flowing to a condenser providing liquid refrigerant which flows to an evaporator in fluid communication with the condenser and the compressor in accordance with the invention includes a bearing pump, coupled to the refrigerant circuit and to the condenser, for providing pressurized refrigerant to the refrigerant circuit at a pressure higher than a pressure of the refrigerant provided continuously by the compressor during operation of the compressor when the bearing pump is operating; and a controller for activating the bearing pump in accordance with at least one predetermined condition of operation of the refrigeration system. One predetermined condition is a temperature of a heat exchange fluid at the condenser sensed by a first temperature sensor coupled to the controller being less than a set temperature. One predetermined condition is a temperature difference between a heat exchange fluid at the condenser and a heat exchange fluid at the evaporator sensed respectively by first and second temperature sensors coupled to the controller being less than a set temperature difference. One predetermined condition is a rotational speed of the compressor rotor sensed by a sensor coupled to the controller sensing a speed of rotation of the rotor being less than a set speed. One predetermined condition is that the refrigerant system has been turned on for less than a set time interval. One predetermined condition is that a pressure drop across the hydrodynamic bearings sensed by a pressure transducer coupled to the controller is less than a set pressure drop.

A method of operation of a refrigeration system having a compressor rotor rotatably supported by a plurality of hydrodynamic bearings lubricated by oiless pressurized liquid refrigerant and pressurizing refrigerant flowing to a condenser providing liquid refrigerant flowing to an evaporator in fluid communication with the condenser and the compressor in accordance with the invention includes continuously applying pressurized refrigerant to the hydrodynamic bearings flowing from the condenser during operation of the compressor and pressurized liquid refrigerant flowing from the bearings to the condenser; and providing supplemental pressurized refrigerant to the hydrodynamic bearings at a pressure higher than a pressure of refrigerant provided by the compressor in accordance with at least one predetermined condition of operation of the refrigerant system. One predetermined condition is a temperature of a heat exchange fluid at the condenser sensed by a first temperature sensor coupled to the controller being less than a set temperature. One predetermined condition is a set temperature difference between a heat exchange fluid at the condenser and a heat exchange fluid at the evaporator sensed respectively by first and second temperature sensors coupled to the controller being less than a set temperature difference. One predetermined condition is a rotational speed of the turbine rotor sensed by a sensor coupled to the controller sensing a speed of rotation of the rotor being less than a set speed. One predetermined condition is that the refrigeration system has been turned on for less than a set time interval. One predetermined condition is that a pressure drop across the hydrodynamic bearings sensed by a pressure transducer coupled to the controller is less than a set pressure drop.

BEST MODE FOR CARRYING OUT THE INVENTION

Figure 1:
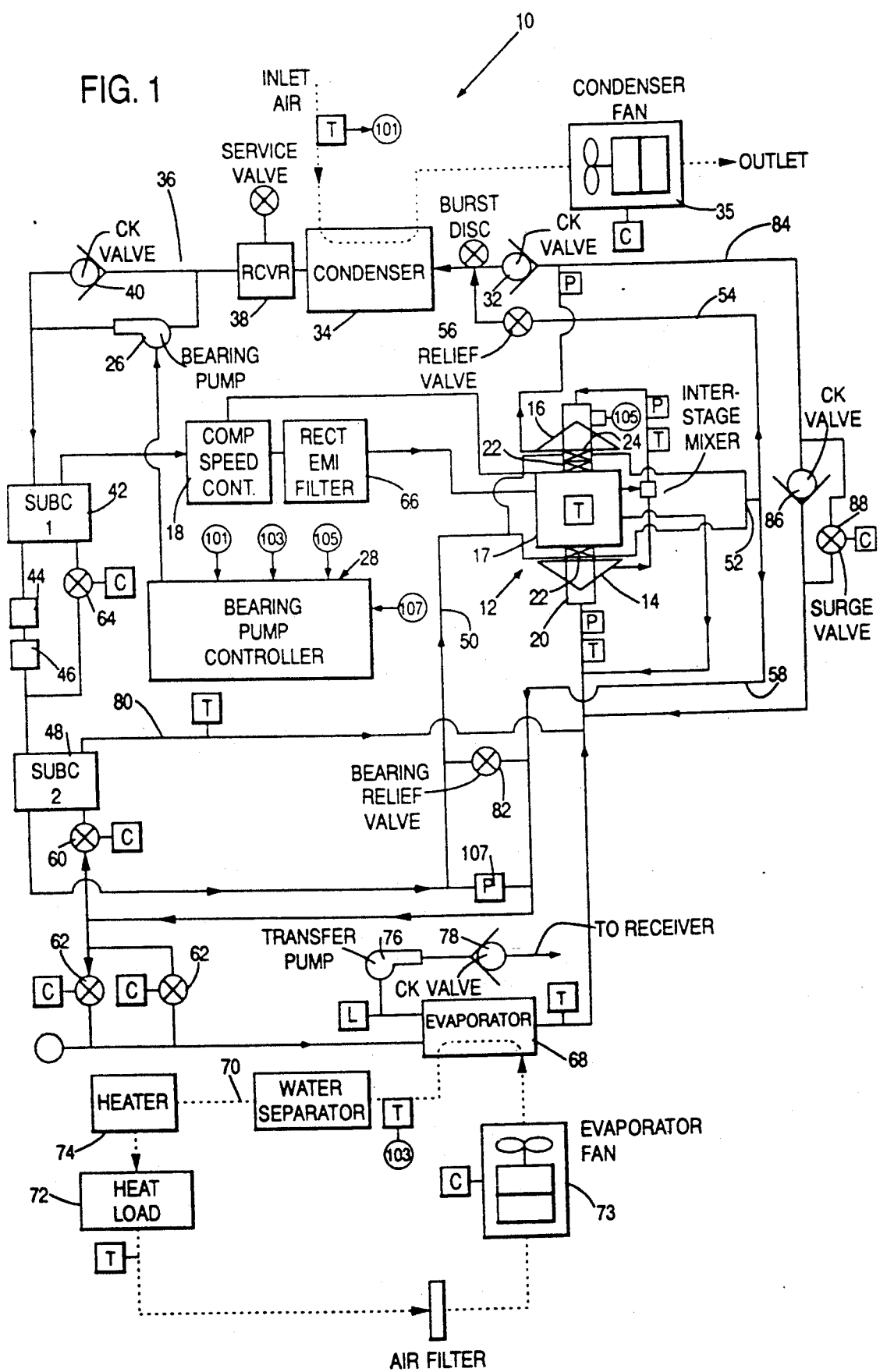
FIG. 1 illustrates a block diagram of a refrigeration system in accordance with the present invention.

FIG. 1 illustrates a refrigeration system 10 in accordance with the present invention. A preferred application of the refrigeration system 10 is cooling avionics on an airframe. The present invention employs a non-azeotropic binary refrigeration fluid. A centrifugal compressor 12, which is comprised of two compressor stages 14 and 16, which are driven by a high-speed electrical motor 17 which runs at a rotational velocity of up to 70,000 rpm. The motor 17 is driven by a speed control 18 of the type described in U.S. Pat. application Ser. Nos. 319,719, 319,727, and 320,224 which are assigned to the Assignee of the present invention. The rotor 20 on which the compressor stages 14 and 16 are mounted is supported by a pair of hydrodynamic radial bearings 22 and a hydrodynamic thrust bearing 24. A hydrodynamic bearing; which is well known, separates surfaces moving relative to each other with a lubricant which is pressurized from a pressure source. The structure of the hydrodynamic radial and thrust bearings is not illustrated for the reason that it is conventional and does not form part of the present invention.

The hydrodynamic radial and thrust bearings 22 and 24 are maintained by pressurized oiless liquid state refrigerant which is provided from two sources. The first source is from the second stage 16 of the compressor 12 and the second source is from a bearing pump 26 which is activated by a bearing pump controller 28 in accordance with predetermined conditions of operation of the refrigeration system which are based upon sensed operation parameters as described below. The function of the bearing pump 26 is to make up for a deficiency in the pressure and quantity of refrigerant outputted from the second stage 16 of the compressor 12 which is necessary to maintain the hydrodynamic radial and thrust bearings 22 and 24 during predetermined operational conditions of the refrigeration system 10. The bearing pump 26 outputs pressurized refrigerant at a pressure higher than the output pressure of the second stage 16 of the compressor 12 when the bearing pump is activated by the bearing pump controller 28 as described below.

The flow of refrigerant through the refrigeration system 10 is described as follows. Pressure and temperature transducers which are located at various points in the system, are identified by a square box respectively containing the letters "P" and "T". Control signals applied to controllable expansion valves, which are provided from a system controller (not illustrated), are identified by a square box labelled with the letter "C". A square box containing the letter "L" is a liquid level sensor providing a signal to the aforementioned system controller (not illustrated). The connections of the liquid level sensor and pressure and temperature transducers to the system controller (not illustrated) have been omitted. Pressurized refrigerant flows from the second stage 16 of the compressor 12 through check valve 32 to condenser 34 at which the pressurized refrigerant gas is condensed to liquid. A first heat exchange fluid, which in this application is air but the invention is not limited thereto, flows in a counterflow direction through the condenser 34 under suction created by a condenser fan 35 to remove heat from the refrigerant and cause the refrigerant to condense to liquid. The refrigerant is outputted by the condenser 34 to a refrigerant circuit 36 which couples the condenser to the radial and thrust hydrodynamic bearings 22 and 24 through a flow path including receiver 38, check valve 40, a first subcooler 42, filter drier 44, sight glass 46, a second subcooler 48 and from the output of the second subcooler 48 through line 50 to the input of the radial and thrust hydrodynamic bearings 22 and 24. The liquid refrigerant discharged from the radial and hydrodynamic bearings 22 and 24 is combined at point 52. The liquid refrigerant flows from point 52 in a first path 54 when relief valve 56 is open to the input of the condenser 34 and through a second path 58 back to an expansion valve 60 and, while the invention is not limited thereto, to a pair of parallel connected expansion valves 62. The relief valve 56 is opened due to the positive displacement characteristics of the bearing pump 26. Flow through valve 56 is determined by the throttling process of valves 60 and 62.

The subcooler 42 functions to cool liquid refrigerant outputted by the receiver 38 to a temperature determined by expansion valve 64 which controls the superheat at the inlet of the second stage 16 of the compressor 12. The expanded refrigerant outputted by the expansion valve 64 cools the liquid refrigerant flowing into the subcooler 42. The liquid refrigerant flowing from the subcooler 42 cools the electronics contained in the compressor speed control 18 and the electronics contained in the rectifier and EMI filter 66 which are components used for driving the electrical motor 17.

The expansion valves 60 and 62 perform different functions. The expansion valve 60 controls the superheat at the output of the subcooler 48. The expansion valves 62 may perform one of two functions. The first function is the controlling of the superheat out of the evaporator 68 which cools air flowing in a direction counter to the flow of refrigerant through the evaporator in an airflow path 70 which cools an avionics heat load 72. The second function is the control of the air temperature out of the evaporator. Only one function may be performed at a time. Fan 73 provides the pressure head to cause air to circulate in the airflow path 70. Optionally, a heater 74, which may have multiple stages but is not limited thereto, may be provided in the air path 70 when cooling of the heat load 72 which may be avionics is not necessary. The evaporator 68 is coupled to the receiver through a transfer pump 76 and a check valve 78.

A function of the second subcooler 48 pertinent to this embodiment of the invention is to lower the temperature of liquid refrigerant flowing out of the first subcooler 42 to a temperature at which the refrigerant will maintain a liquid state flowing through the hydrodynamic radial and thrust bearings 22 and 24 after absorbing heat therein. The cold side output 80 from the second subcooler 48 combines with the refrigerant flow to the first stage 14 of the compressor 12. The output from the evaporator 68 also supplies the input to the first stage 14 of the compressor.

A bearing relief valve 82 bypasses the hydrodynamic radial and thrust bearings 22 and 24 when the pressure across the bearings reaches a predetermined maximum pressure, such as 50 psi, to avoid dropping excessive pressure across the hydrodynamic radial and thrust bearings 22 and 24 which may damage the bearings. A $\Delta P$ pressure transducer 107 senses when the pressure drop across the radial and thrust bearings 22 and 24 is less than 18 psi. The function of $\Delta P$ pressure transducer 107 is described below in conjunction with FIG. 2.

The output from the second stage 16 of the compressor 12 also flows through a fluid circuit 84 which contains a parallel connection of a check valve 86 and a surge valve 88. The surge valve 88 permits recirculation of refrigerant from the output stage 16 back to the input stage 14 of the compressor 12 during surge conditions in a manner which is known.

As stated above, the function of the bearing pump 26 is to provide supplemental pressurized refrigerant to the hydrodynamic radial and thrust bearings 22 and 24 under conditions of operation of the compressor 12 where the output pressure from the second stage 16 is insufficient to maintain the necessary minimum pressure and flow rate to the hydrodynamic radial and thrust bearings. The bearing pump controller 28 activates the bearing pump 26 in accordance with predetermined conditions of operation of the refrigeration system 10 as discussed below in conjunction with FIG. 2. The predetermined conditions are controlled by sensing a plurality of operational parameters of the refrigeration system as discussed below with respect to FIG. 2.

Figure 2:
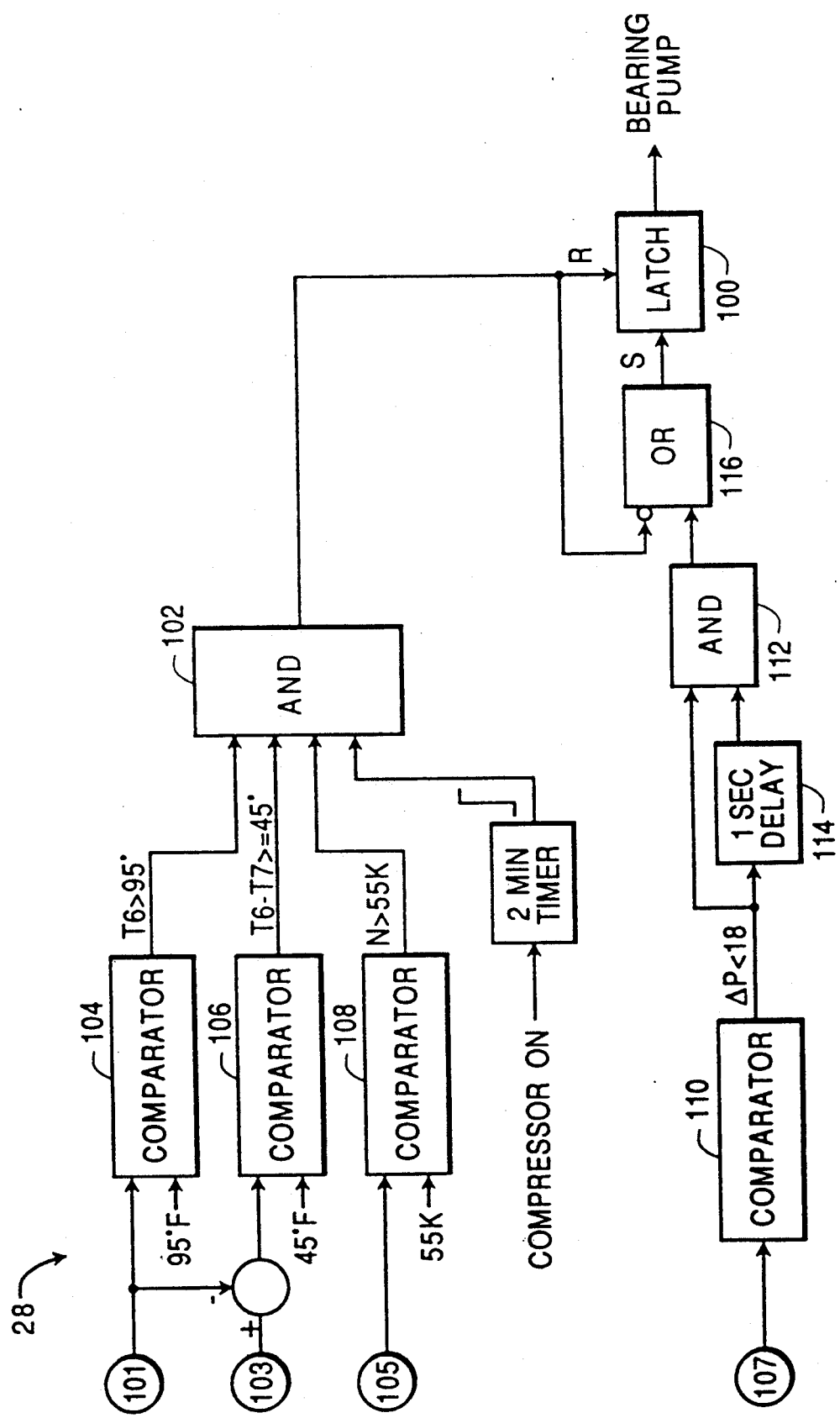
FIG. 2 illustrates a controller for a bearing pump in accordance with the present invention.

FIG. 2 illustrates a block diagram of a bearing pump controller 28 as illustrated in FIG. 1. The bearing pump controller 28 is responsive to at least one sensor and in a preferred implementation, as illustrated in FIG. 2, is responsive to sensor inputs illustrated in FIG. 1 from a first temperature sensor 101 which senses the temperature of inlet air to the condenser 34, a second temperature sensor 103 which senses the output temperature of air in path 70 from the evaporator 68, speed sensor 105 which senses the rotational speed of the rotor 20 of the compressor 12, and $\Delta P$ pressure transducer 107 which senses the pressure drop across the hydrodynamic radial and thrust bearings 22 and 24. The bearing pump 26 is turned on when the output state from latch 100, which may be a conventional flip-flop, is high. The output state of the latch 100 is reset to a low level which causes the bearing pump 26 to turn off when the output from AND gate 102 goes high. The output from AND gate 102 goes high when four predetermined conditions exist concurrently. The first predetermined condition is when the output of comparator 104 goes high which occurs when the temperature sensed by sensor 101 is greater than 95° F. The second predetermined condition is when the output of comparator 106 goes high when the difference between the temperature sensed by the sensor 101 and the sensor 103 is greater than 45° F. The third predetermined condition occurs when the output of comparator 108 goes high which occurs when the rotational velocity of the rotor 20 sensed by sensor 105 is greater than 55,000 rpm. The fourth predetermined condition occurs after the overall system has been turned on for a predetermined time interval by activating of the compressor motor 17 under the control of the compressor speed control 18. A fifth predetermined condition which causes the bearing pump to turn on is when the comparator output 110 goes high when the drop sensed by the $\Delta P$ pressure transducer 107 is less than 18 psi causing the output of AND gate 112 to go high after a debounce delay period of one second due to the one second delay 114 delaying the comparator 110 output for one second if the output of the comparator is high for at least one second. The output of AND gate 112 is applied to a first input of OR gate 116 which has a second input which is an inversion of the output of AND gate 102. The output of the OR gate 116 sets the latch 100 causing the bearing pump 26 to be activated when anyone of the aforementioned five predetermined conditions occurs. When the output of the AND gate 112 is low, the latch 100 is set as a consequence of the second input to the OR gate 116 being an inversion of the output of the AND gate 102. As a result, if any one of the outputs from the comparators 104–110 is low or the compressor motor has not been on for more than two minutes, the output of the latch 100 will be high which causes the bearing pump 26 to apply an increased flow rate of higher pressure refrigerant to the refrigerant circuit 36.

While FIG. 2 illustrates a preferred bearing pump controller 28 to be utilized in the refrigeration system of FIG. 1, it should be understood that other operational parameters of the refrigeration system may be sensed for controlling the operation of the bearing pump 26 and other predetermined conditions of operation may be utilized for activating the bearing pump such as when it is desired to cool the avionics 72 without operation of the compressor. The pressurized refrigerant provided by the bearing pump 26 may be expanded to cool the evaporator 68. Finally, while the preferred implementation of the bearing pump controller 28 is based upon sensing of operational parameters of the refrigeration system 10, it should be understood that the invention is not limited to control of the bearing pump 26 being based upon the sensing of operational parameters.

A method of operating the refrigeration system of FIGS. 1 and 2 comprises applying pressurized refrigerant to the hydrodynamic radial and thrust bearings 22 and 24 flowing from the compressor 34 during operation of the refrigeration system 10 and providing supplemental pressurized refrigerant from the bearing pump 26 to the hydrodynamic bearings at a pressure higher than a pressure of refrigerant provided by the compressor 12 in accordance with predetermined conditions of operation of the refrigeration system. One of the predetermined conditions is a temperature of the air flowing through the condenser 34 sensed by a first temperature sensor 101 which is coupled to the controller 28 is less than a set temperature which, as illustrated in FIG. 2, is 95° F. Another of the predetermined conditions is a temperature difference between the air flowing through the condenser 34 and the air flowing through the evaporator 68 sensed respectively by the first and second temperature sensors 101 and 103 is less than a set temperature which is illustrated in FIG. 2 as 45° F. Another of the predetermined conditions is that the refrigeration system 10 has been turned on for less than two minutes. Another of the predetermined conditions is that a pressure drop across the hydrodynamic bearings 22 and 24 sensed by the ΔP pressure transducer 107 coupled to the bearing pump controller 28 is less than a set pressure difference which is illustrated in FIG. 2 as 18 psi. Finally, one of the predetermined conditions is a rotational speed of the turbine rotor 20 sensed by speed sensor 105 coupled to the bearing pump controller 28 sensing a speed of rotation of the rotor 20 is less than a set speed which in FIG. 2 is illustrated as 55,000 rpm.

While the invention has been described in terms of its preferred embodiment, it should be understood that numerous modifications may be made thereto without departing from the spirit and scope of the invention as defined in the appended claims. It is intended that all such modifications fall within the scope of the appended claims.

We claim:

1. A refrigeration system having a compressor rotor rotatably supported by a plurality of hydrodynamic bearings lubricated by oiless pressurized liquid refrigerant and pressurizing refrigerant which flows to a condenser providing liquid refrigerant which flows to an evaporator in fluid communication with the condenser and the compressor comprising:
    a refrigerant circuit, coupled to the compressor and to the condenser, for providing pressurized liquid refrigerant to the hydrodynamic bearings from the condenser continuously during operation of the compressor and pressurized liquid refrigerant flowing from the bearings to the condenser;
    a bearing pump, coupled to the refrigerant circuit and to the condenser, for providing pressurized liquid refrigerant at a pressure higher than a pressure of the refrigerant provided by the compressor rotor when the bearing pump is operating to the refrigeration circuit;
    at least one sensor, each sensor sensing an operational parameter of the refrigeration system and providing a signal representative of the sensed parameter; and
    a controller, responsive to at least one signal representative of a sensed parameter, for controlling the operation of the bearing pump as a function of the at least one signal to provide pressurized refrigerant to the refrigerant circuit at a pressure higher than a pressure of refrigerant provided by the compressor.

2. A refrigeration system in accordance with claim 1 wherein:
    one sensor is a first temperature sensor sensing a temperature of a heat exchange fluid at the condenser; and
    the controller controls activation of the bearing pump as a function of the sensed temperature at the condenser.

3. A refrigeration system in accordance with claim 2 wherein:
    the bearing pump is activated by the controller unless the sensed temperature is greater than a set temperature.

4. A refrigeration system in accordance with claim 1 wherein:
    a first sensor is a temperature sensor sensing a temperature of a heat exchange fluid at the condenser and a second sensor senses a temperature of a heat exchange fluid at the evaporator; and
    the controller controls activation of the bearing pump as a function of a difference between the temperatures sensed by the first and second sensors.

5. A refrigeration system in accordance with claim 4 wherein:
    the bearing pump is activated by the controller unless the difference between sensed temperatures is greater than a set difference.

6. A refrigeration system in accordance with claim 1 wherein:
    one sensor is a speed sensor sensing a speed of rotation of the compressor rotor; and
    the controller controls activation of the bearing pump as a function of the sensed speed of the compressor rotor.

7. A refrigeration system in accordance with claim 6 wherein:
    the bearing pump is activated by the controller unless the sensed speed of rotation is greater than a set speed of rotation of the rotor.

8. A refrigeration system in accordance with claim 1 wherein:
    one sensor is a pressure sensor sensing a pressure drop across the hydrodynamic bearings; and
    the controller controls activation of the bearing pump as a function of the sensed pressure drop across the hydrodynamic bearings.

9. A refrigeration system in accordance with claim 8 wherein:
    the bearing pump is activated by the controller in response to the sensed pressure drop across the hydrodynamic bearings being less than a set pressure.

10. A refrigeration system in accordance with claim 9 wherein:
    the controller activates the bearing pump in response to the sensed pressure drop across the hydrodynamic bearings being less than the set pressure drop for a predetermined time interval.

11. A refrigeration system in accordance with claim 1 wherein:
    the controller causes the bearing pump to be activated for a set time interval in response to the controller turning on the refrigeration system.

12. A refrigeration system in accordance with claim 1 wherein:
    one sensor is a first temperature sensor sensing a temperature of a heat exchange fluid at the condenser;
    one sensor is a second sensor sensing a temperature of a heat exchange fluid at the evaporator;
    one sensor is a speed sensor sensing a speed of rotation of the compressor rotor;
    one sensor is a pressure sensor sensing a pressure drop across the hydrodynamic bearings; and wherein the controller causes the bearing pump to be activated for a set time interval in response to the controller turning on the refrigeration system, and control of the activation of the bearing pump is a function of the sensed temperature at the condenser, a difference between the temperature sensed by the first and second sensors, the sensed speed of rotation of the compressor rotor and the sensed pressure drop across the hydrodynamic bearings.

13. A refrigeration system in accordance with claim 12 wherein:

the bearing pump is activated by the controller unless the sensed temperature sensed by the first sensor is greater than a set temperature, the difference between the temperatures sensed by the first and second temperatures is greater than a set difference, the sensed pressure drop across the hydrodynamic bearings is more than a set pressure, the speed of rotation is greater than a set speed of rotation of the rotor, and the bearing pump has been activated for a set time interval in response to the controller turning to the refrigeration system.

14. A refrigeration system having a compressor rotor rotatably supported by a plurality of hydrodynamic bearings lubricated by oiless pressurized liquid refrigerant supplied to a refrigerant circuit, coupled to the hydrodynamic bearings and to a condenser, the pressurized liquid refrigeration at least in part flowing continuously from the condenser during operation of the compressor and pressurized liquid refrigerant flowing from the bearings to the condenser and pressurizing refrigerant which flows to the condenser providing liquid refrigerant which flows to an evaporator in fluid communication with the condenser comprising:

a bearing pump, coupled to the refrigerant circuit and to the condenser, for providing pressurized refrigerant to the refrigerant circuit at a pressure higher than a pressure of the refrigerant provided continuously by the compressor during operation of the compressor when the bearing pump is operation; and a controller for activating the bearing pump in accordance with at least one predetermined condition of operation of the refrigeration system.

15. A refrigeration system in accordance with claim 14 wherein:

one predetermined condition is a temperature of a heat exchange fluid at the condenser sensed by a first sensor coupled to the controller being less than a set temperature.

16. A refrigeration system in accordance with claim 14 wherein:

one predetermined condition is a temperature difference between a heat exchange fluid at the condenser and a heat exchange fluid at the evaporator sensed respectively by first and second sensors coupled to the controller being less than a set temperature difference.

17. A refrigeration system in accordance with claim 14 wherein:

one predetermined condition is a rotational speed of the turbine rotor sensed by a sensor coupled to the controller sensing a speed of rotation of the rotor being less than a set speed.

18. A refrigeration system in accordance with claim 14 wherein:

one predetermined condition is that the refrigeration system has been turned on for less than a set time interval.

19. A refrigeration system in accordance with claim 14 wherein:

one predetermined condition is that a pressure drop across the hydrodynamic bearings sensed by a pressure transducer coupled to the controller is less than a set pressure drop.

20. A method of operation of a refrigeration system having a compressor rotor rotatably supported by a plurality of hydrodynamic bearings lubricated by oiless pressurized liquid refrigerant and pressurizing refrigerant which flows to a condenser providing liquid refrigerant which flows to an evaporator in fluid communication with the condenser and the compressor comprising:

continuously applying pressurized liquid refrigerant to the hydrodynamic bearings flowing from the condenser during operation of the compressor and pressurized liquid refrigerant flowing from the bearings to the condenser; and providing supplemental pressurized liquid refrigerant to the hydrodynamic bearings at a pressure higher than a pressure of refrigerant provided by the compressor in accordance with at least one predetermined condition of operation of the refrigeration system.

21. A method of operating a refrigeration system in accordance with claim 20 wherein:

one predetermined condition is a temperature of a heat exchange fluid at the condenser sensed by a first sensor coupled to the controller being less than a set temperature.

22. A method of operating a refrigeration system in accordance with claim 20 wherein:

one predetermined condition is a temperature difference between a heat exchange fluid at the condenser and a heat exchange fluid at the evaporator sensed respectively by first and second sensors coupled to the controller being less than a set temperature difference.

23. A method of operating a refrigeration system in accordance with claim 20 wherein:

one predetermined condition is a rotational speed of the turbine rotor sensed by a sensor coupled to the controller sensing a speed of rotation of the rotor being less than a set speed.

24. A method of operating a refrigeration system in accordance with claim 20 wherein:

one predetermined condition is that the refrigeration system has been turned on for less than a set time interval.

25. A method of operating a refrigeration system in accordance with claim 20 wherein:

one predetermined condition is that a pressure drop across the hydrodynamic bearings sensed by a pressure transducer coupled to the controller is less than a set pressure drop.

* * * * *